April 23, 1929.   J. M. SHORT   1,710,117

LOCK NUT

Filed Oct. 21, 1927

INVENTOR
John M. Short
BY
N. E. Dunlap
ATTORNEY

UNITED STATES PATENT OFFICE.

JOHN M. SHORT, OF WHEELING, WEST VIRGINIA.

LOCK NUT.

Application filed October 21, 1927. Serial No. 227,732.

This invention relates to improvements in lock nuts, and it has for its primary object to provide a simple and efficient nut of the so-called self-locking type which, following application, is positively held against chance retraction, and which, when occasion requires, may readily be removed.

In describing the invention in detail, reference is herein had to the accompanying drawings, in which—

Figure 2:
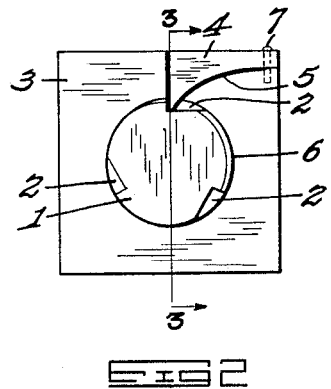
Figure 2 is an outer face view of the same.

Referring to said drawings, 1 designates a threaded bolt which has therein one or more longitudinal thread-intersecting channels 2. Screwed upon said bolt is a nut 3, herein shown as rectangular in form, which has a pawl 4 pivotally mounted in a recess 5 provided therefor in a corner portion of the outer face of the nut. Said recess opens at its inner end into the threaded bore 6 of the nut, as is shown in Figs. 2 and 3, thus to permit the point of the pawl to occupy a position wherein it may ride upon the threads of the bolt as the nut is rotated in a forward direction and wherein it will abut against the upright wall of one of the channels 2 of the bolt for preventing chance retraction of the nut.

The inner end wall of the recess 5 is located in a radial line which intersects one side of the nut approximately in the mid-length thereof. The opposite end of the recess, which is of relatively slight width, opens outward through a side of the nut, as shown. The pawl 4 substantially corresponds in form with that of said recess and has its outer end mounted on a pivot-pin 7 which extends parallel to the face of the nut and which has its point permanently fixed in the nut.

Figure 3:
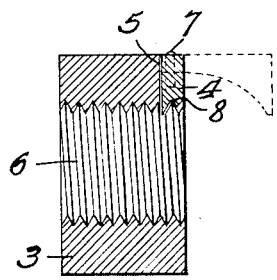
Figure 3 is a cross section of the nut on line 3—3, Fig. 2; and—
Figure 4:
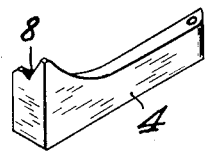
Figure 4 is an enlarged perspective view of the pawl, detached.

The point of the pawl has a width at least equal to the width of the thread employed on the bolt and is, therefore, provided with one or more grooves 8, as shown in Figs. 3 and 4, adapted conformably to embrace such bolt thread or threads.

The pawl has sufficient play upon its pivotal mounting that it is permitted a slight radial movement at its inner end. Therefore, as the nut is rotated forwardly upon the bolt, the point of the pawl rides over the bolt threads between the channels 2 and drops into the successive channels as the latter pass thereunder. Manifestly, chance retraction of the nut is prevented by interengagement of the point of the pawl with the rear wall of the channel 2.

Figure 1:
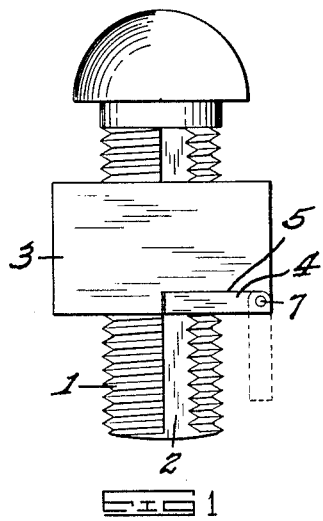
Figure 1 is a side elevation of the invention.

When, for any reason, it is desired to remove the nut from its bolt, the pawl may be swung from the position in which its point is disposed in one of the channels to a position in which it substantially parallels the bolt, as shown in broken lines in Figs. 1 and 3. Such swinging movement of the pawl is positively prevented, however, when the latter is interengaged with the bolt threads.

What is claimed is:—

In a nut lock, a bolt having a longitudinal thread-intersecting channel, a nut having a recess formed in its outer face, which opens into the bore of the nut, a pawl disposed in said recess and having a point extending outwardly at an angle to the under face of the pawl and engageable in the channel of the bolt, and a pivot for the pawl rigidly fixed in the nut and having its axis parallel to the face of the nut and loosely fitting its bearing in the pawl so as to allow the pawl to be swung longitudinally of the bolt to lie bodily beyond the outer face of the nut, and to be also rocked laterally of the bolt so as to cause its said point to be moved radially of the bolt and out of the channel of the bolt.

In testimony whereof, I affix my signature.

JOHN M. SHORT.